(No Model.) 5 Sheets—Sheet 1.

P. P. WENZ.
TYPE WRITING MACHINE.

No. 438,965. Patented Oct. 21, 1890.

WITNESSES:
Phil. C. Dieterich.
C. Sedgwick.

INVENTOR:
P. P. Wenz
BY Munn & Co.
ATTORNEYS.

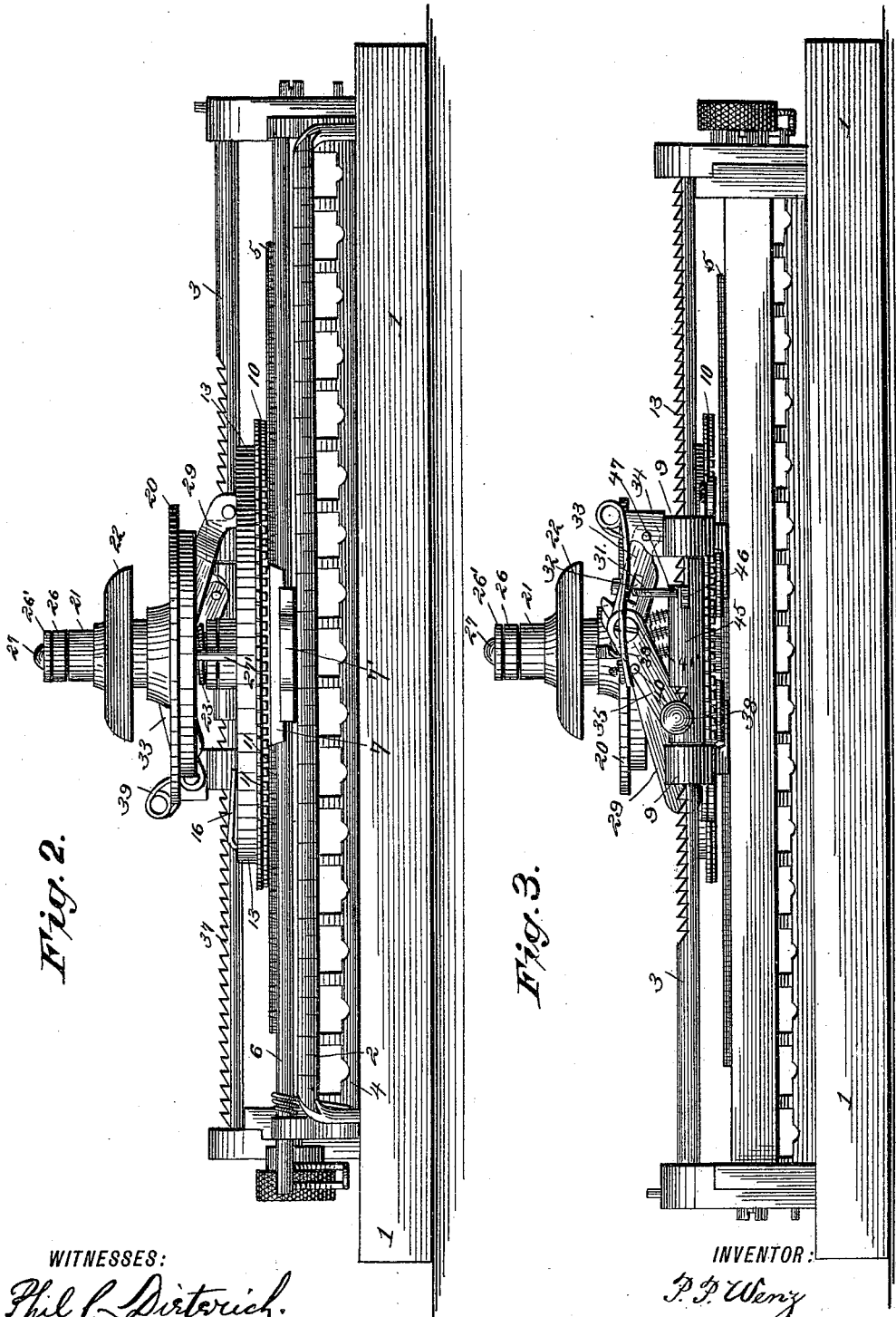

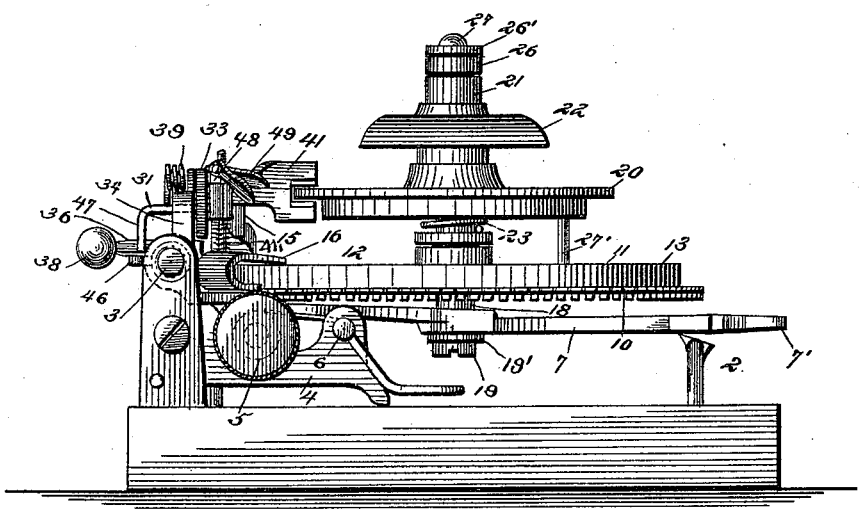
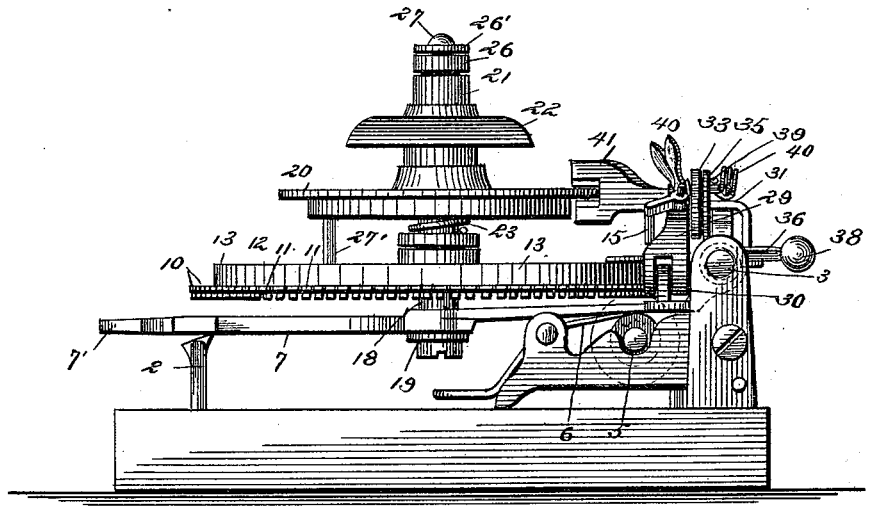
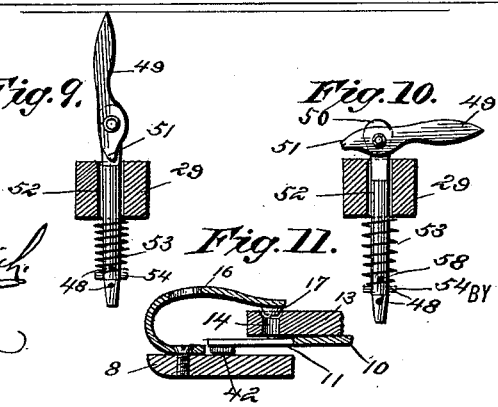

(No Model.) 5 Sheets—Sheet 4.

P. P. WENZ.
TYPE WRITING MACHINE.

No. 438,965. Patented Oct. 21, 1890.

WITNESSES: Phil C. Dieterich, C. Sedgwick

INVENTOR: P. P. Wenz
BY Munn & Co.
ATTORNEYS.

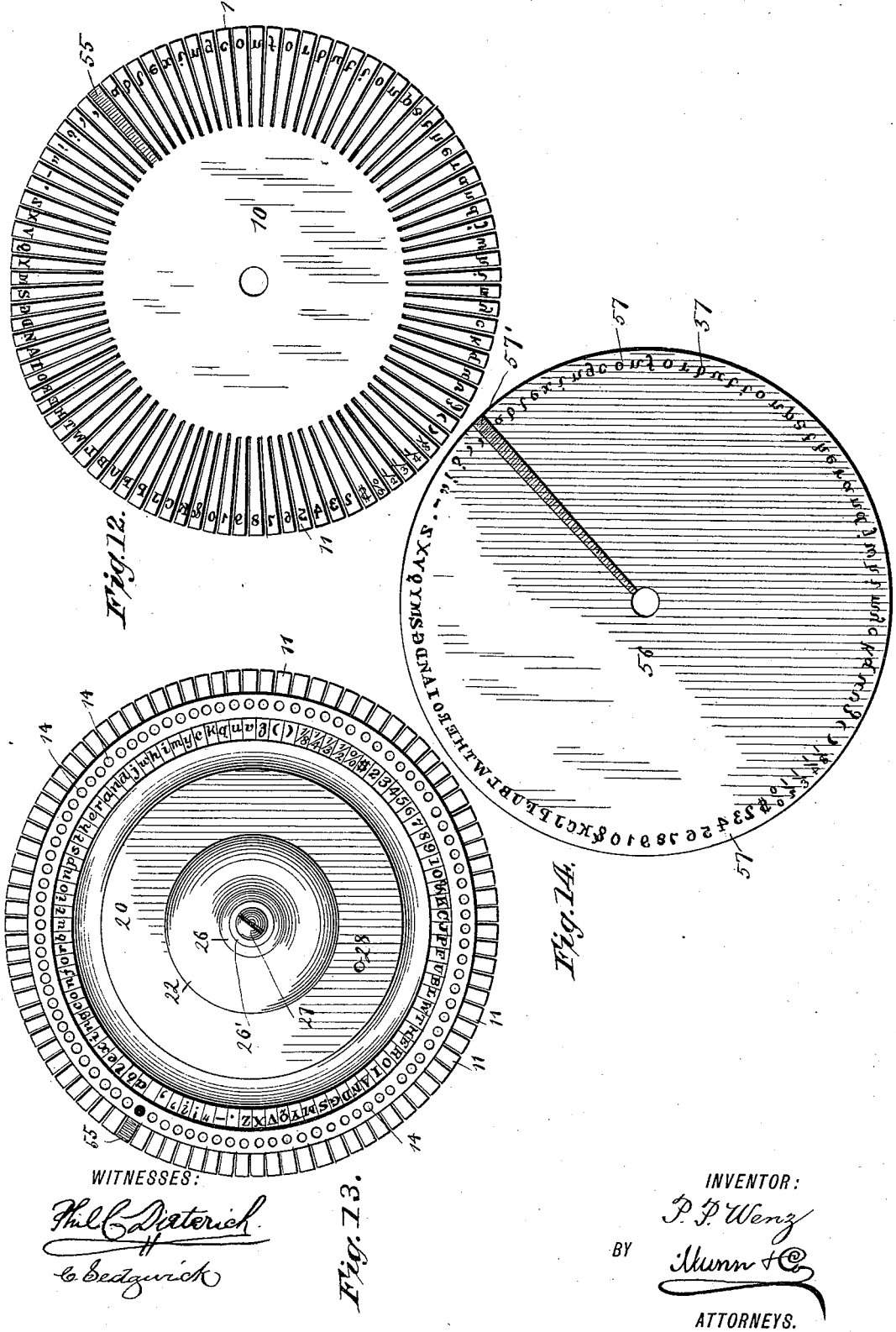

UNITED STATES PATENT OFFICE.

PHILIP P. WENZ, OF MEADVILLE, PENNSYLVANIA.

TYPE-WRITING MACHINE.

SPECIFICATION forming part of Letters Patent No. 438,965, dated October 21, 1890.

Application filed October 12, 1888. Serial No. 287,883. (No model.)

*To all whom it may concern:*

Be it known that I, PHILIP P. WENZ, of Meadville, in the county of Crawford and State of Pennsylvania, have invented a new and Improved Type-Writing Machine, of which the following is a full, clear, and exact description.

This invention relates to type-writers, and has for its object to provide a type-writer which will be simple in construction, easily operated, and effective in its work.

The invention consists in a type-writer, and in details of construction thereof constructed and arranged as hereinafter described and claimed.

Reference is to be had to the accompanying drawings, forming a part of this specification, in which similar figures of reference indicate corresponding parts in all the views.

Figure 1:
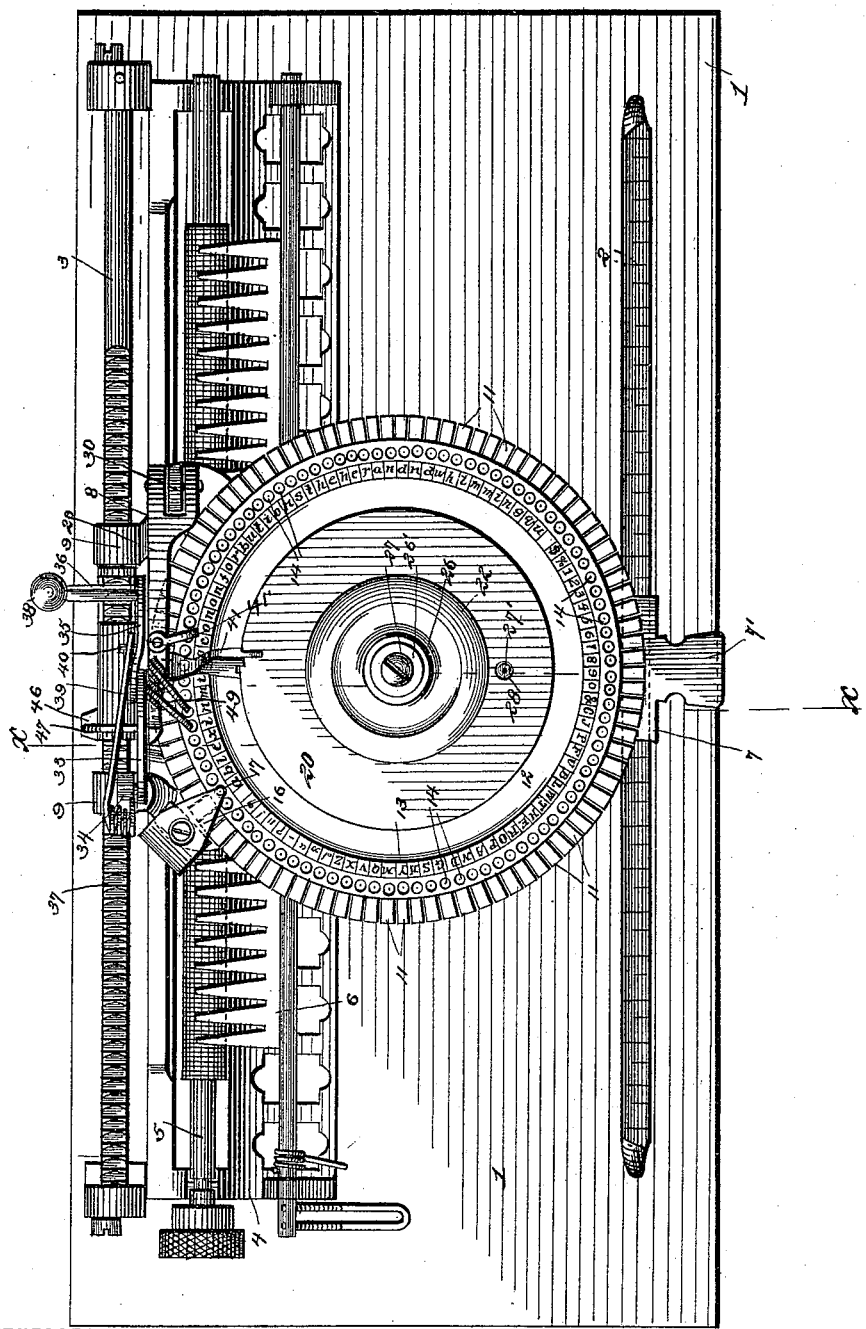
Figure 6:
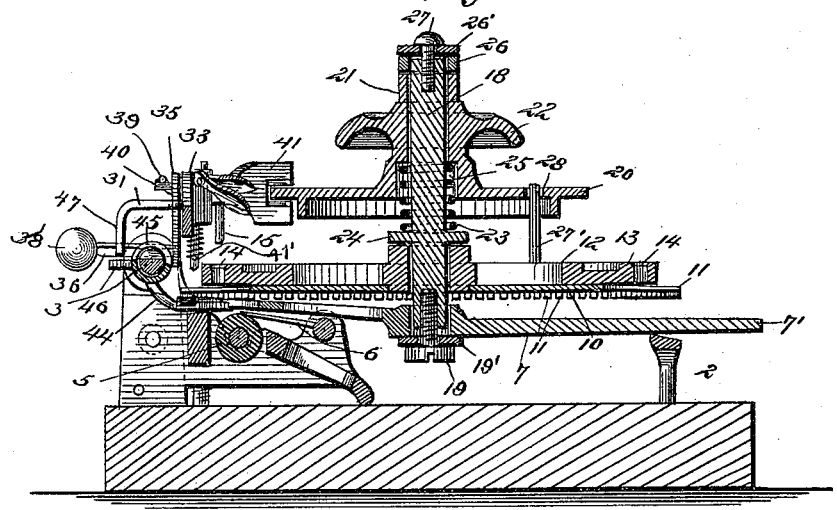
Figure 7:
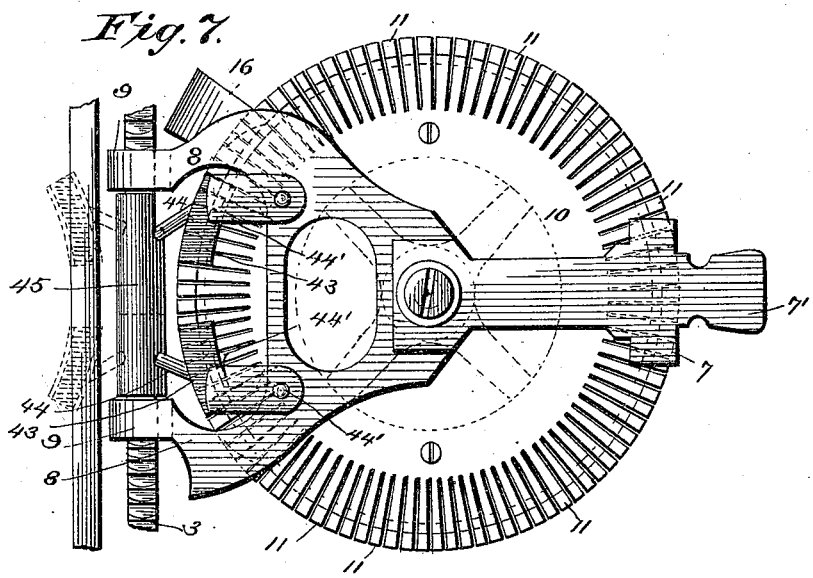
Figure 8:
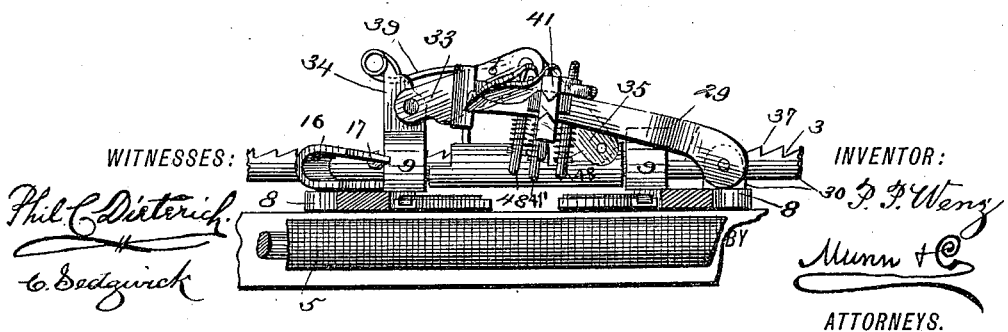

Figure 1 is a plan view of the machine. Fig. 2 is a front view. Fig. 3 is a rear view. Fig. 4 is an end view looking from the left in Fig. 1. Fig. 5 is an end view looking from the right in Fig. 1. Fig. 6 is a vertical section on the line $x$ $x$ of Fig. 1. Fig. 7 is a detail reversed plan view looking at the under side of the type-wheel and its connections. Fig. 8 is a detail view of the feed mechanism. Figs. 9 and 10 are details of an adjustable type-hammer. Fig. 11 is a detail in section of the type-indicator. Fig. 12 is a plan view of the under side of the type-wheel detached. Fig. 13 is a plan view of the type-wheel and operating-handle, and Fig. 14 is a plan view of the under side of a modified form of type-wheel.

In the construction of this invention 1, indicates the base of the machine, upon which is mounted the graduated space-bar 2, the rack-feed bar 3, and the frame 4, with paper-feed roller 5 and paper-clamp 6. Upon a frame 7, having its forward part resting on the space-bar with 2 a lifting-handle 7′, and hinged at its rear by means of the arms 8, having sleeves 9, movable on the bar or rod 3, is pivoted the horizontal type-wheel constructed as follows: The bottom of the type-wheel is formed with a metallic disk or frame 10, having its periphery formed with elastic arms or levers 11, carrying the type. Above the disk 10 is located a circular metallic frame 12, with a rim 13, having on its upper surface the perforations 14, located over the elastic arms 11, for the passage of the type-centering pin 15. The type, which may be of metal or rubber, as desired, have the upper and lower case letters arranged as hereinafter set forth. Adjacent to perforations 14 are located on the rim 13 letters corresponding to the letters on the arms 11. On one of the arms 8 is mounted an elastic arm 16, having a pin 17, which rests in a perforation 14, and under which the perforations 14 move in rotating the type-wheel. The elastic arm 16, with its pin 17, serves as a marker to indicate the letter brought beneath the type-centering pin 15, the letters being so relatively arranged on both sides of the type-wheel that a letter on rim 13 opposite pin 17 will be the same as the letter brought beneath the type-centering pin 15.

Upon a post 18, mounted and secured by means of a screw 19 and washer 19′ on the frame 7, and on which the type-wheel is pivoted, is a disk 20, having a vertical tubular portion or sleeve 21, through which post 18 projects, and an operating handle or knob 22. The disk 20 is supported on a coiled spring 23, having its lower end resting on a flange 24 on post 18 and its upper end located in a shouldered recess 25 in sleeve 21. The upper end of sleeve 21 abuts against a ring 26 and a disk 26′, fastened by a screw 27 to the top of post 18. By this means the disk 20 is permitted to move vertically on the post 18. In order that the disk 20 may move with the type-wheel, the frame 12 is provided with a vertical pin 27′, which projects through a hole 28 in disk 20. In this way the type-wheel may be turned to bring the proper letter into position by operating the knob 22.

The type-hammer and feed mechanism are constructed as follows: An impression-lever 29 is hinged at one end to a lug 30 on one of the arms 8, and at its other end has a laterally-projecting pin 31, engaging a slot 32 in a lever 33, pivoted at one end to a lug 34 on one of the sleeves 9, and at the other end having a pivoted arm 35, with a lateral arm 36 engaging the teeth 37 of rack-bar 3. The outer end of arm 36 is provided with a lifting-knob 38 to disengage it from teeth 37. A spring-arm 39, mounted on lug 34 and resting on a pin 40 on the arm 35, holds the arm 36 in engagement with teeth 37. Upon the lever 29 is mounted a lateral lug or arm 41, from which depends the type-centering pin 15, the forked end of lug 41 engaging the edge of disk 20. The lever 29 also carries a type-hammer 41' adjacent to centering-pin 15. It will thus be seen that as the disk 20 is depressed by means of the knob 22 the lug 41 and lever 29 will be moved downward, carrying with it the type-centering pin 15 and the type-hammer 41', and the former, passing through one of the perforations 14, acts on one of the elastic levers to hold it down until struck by the type-hammer to impress a type against the paper beneath. At the same time the lever 29 is moved downward, carrying with it lever 33 and arm 35. This movement of arm 35 causes the lateral arm 36 to be moved forward over rack-bar 3 and to engage the next or succeeding tooth 37. Upon releasing the downward pressure on knob 22 disk 20 is thrown up by spring 23, which raises levers 29 and 33 and pivoted end of arm 35, and the arm 36, held by spring 39 in engagement with the rack-bar 3, draws the sleeves 9 forward on the rack-bar 3, and with them advances the frame 7 with the type-wheel. As shown in Fig. 12, the elastic arms 11 are provided with type 42, of metal or rubber. The type 42 are inked by means of the pads 43, located adjacent to the striking-point of type-hammer 41' on arms 44, mounted on a rotary sleeve 45, having its bearings in the sleeve 9. A flat projection 46 on sleeve 45 is located below the depending arm 47 of pin 31. By means of this construction in the case of metal type-arms every time the type-hammer acts to print a letter a number of type are inked by the arm 47 forcing down the projection 46, thereby rotating the sleeve 45 and throwing up the ink-pads 43 against a number of the type on each side of and adjacent to the striking-point of the type-hammer. The weight of the arms 44 and pads 43 is sufficient to cause them to drop down onto the supporting-arms 44' on frame 7 when the pin 31, with arm 47, is raised. In a rubber type-plate this arrangement is not needed. The type are arranged on opposite sides of the circular frame 10 in upper and lower case, respectively, and necessary signs, symbols, and marks are also provided.

The letters of the type are arranged in such order as to present such sequence of letters as abl, ex, in, ing, con, on, for, or, but, ion, st, the, her, an, and, whi, im, qu, ck, and other combinations of letters following each other in words of common use. With this arrangement of letters a portion of a word may be printed at one operation of the type-hammer by means of the following mechanism: A number of type-hammer pins 48 are mounted in the lever 29 to move vertically therein and depend above the arms 11 on disk 10. The length of the pins 48 is such that in the operation of lever 39 they will not act on the arms 11, being held up out of the way by levers 49, pivoted in ears 50 on the pins 48 and having projecting ends 51 adapted to bear against the top of lever 29. To hold up the pins 48 out of the way, they are raised to the vertical position shown in Fig. 9, the end 51 resting at the side of perforation 52. Upon turning down the lever 49 the pin 48 is thrown down into position to act on an arm 11 by the action of a coiled spring 53, encircling the pin 48 and having one end bearing against lever 29 and the other against a pin 54 in pin 48. Any number of the pins 48 may be employed. The type-hammer 41' may be raised and held up in the same way. On printing a word the hammer 41' is operated to print single letters by pressing down the arms 11 one at a time. A number of the letters of the word may be printed in conjunction with the type-hammer 41' by lowering the pins 48, as above described, and depressing disk 10 by means of the handle 22. 55 indicates a space-key consisting of an arm similar to arm 11, except that it is thicker, so that it will not spring down when struck by the hammer. Spaces are left by means of rotating the disk 10 to bring the space-key 55 beneath the type-hammer 41' and depressing the disk 10. After two or more letters have been printed at once multiple spacing is effected by raising all the hammers, rotating the type-wheel a suitable distance, and depressing disk 10, or by raising the hammers 48, rotating the type-wheel to bring the space-key 55 beneath the hammer 41', and depressing the disk 10. In lieu of the elastic arms 11 a rubber disk 56, as shown in Fig. 12, may be used with type 57 arranged thereon similarly to type 42. In the case of the rubber disk 56 the space-key is formed by securing a metal arm 57' in the rubber disk rigid enough to support the type-hammer. The action of pins 48 may be regulated by adjusting pin 54 in holes 58, thereby governing the tension of spring 53.

By means of the machine constructed as herein set forth the printing may be effected by rotating disk 10 with handle 22 to bring type-hammer 41' above an elastic type-carrying arm 11 and printing a single letter at a time by depressing the disk 10, at the same time causing the letters adjacent to the striking-point to be inked. Upon the release of disk 10 the disk 20, moving upward by the action of spring 23, acts on arm 41, which operates the feed mechanism to move frame 7 forward, the sleeves 9 sliding on the rod 3. By adjusting the pins 48 several letters may be printed simultaneously by the foregoing-described operation of type-hammers 41' and 48. By means of the elastic arms 11 or the rubber disk 56 the letters will be clearly and properly printed. The frame 7 may be lifted up to inspect the paper by means of handle 7', and can be slid backward on rod 3 to starting position by lifting arm 36.

While I have described a specific construction of parts, I do not desire to limit myself thereto, as the parts may be varied without departing from the essential features of the invention.

Having thus fully described my invention, I claim as new and desire to secure by Letters Patent—

1. In a type-writer, the combination, with a horizontal type-wheel having an elastic periphery with type arranged on its under side to present sequences or combinations of letters, substantially as described, and a vertically-movable spring-actuated rotary disk connected with the type-wheel, of a feed mechanism, an impression-lever connected to the feed mechanism and having a type-hammer and a series of adjustable type-hammers adapted to be moved into position to co-operate with the type-hammer and print a number of consecutive letters, and an arm connected with the impression-lever and engaging the vertically-movable disk, substantially as shown and described.

2. In a type-writer, the combination, with the horizontal type-wheel having an elastic periphery with type on its under side, and a spring-seated finger-disk movable vertically on the axis of the type-wheel independently of said wheel and connected therewith, of a printing-lever and feed mechanism operated by said disk in its vertical movement, and an oscillating inking-pad actuated by the printing-lever in its downward movement, substantially as set forth.

3. The combination, with the type-wheel having a flexible periphery provided on its lower side with a circular series of letters, some of which form words and parts of words, of an impression-lever provided with a main and auxiliary hammer whereby a single letter or said words or parts of words may be printed at one stroke, substantially as set forth.

4. In a type-writer, the combination, with a notched feed-bar, of a carriage hinged to the bar, a type-wheel mounted on the carriage and having an elastic periphery with type arranged on the under side thereof, an impression-lever mounted on the carriage and provided with a type-hammer, a feed-lever connected with the impression-lever, and a rotary finger-disk connected with the type-wheel to rotate the same, movable vertically independently thereof and engaging the impression-lever with its periphery, substantially as shown and described.

5. In a type-writer, a frame 7, connected by sliding sleeves 9 to a rack-bar 3 and having a vertical post 18, a type-wheel consisting of a circular frame 10, mounted on post 18, having its periphery formed with elastic arms 11, with type 42, a circular vertically-movable rotary disk 20, with handle 22, loosely mounted on post 18, resting on a coiled spring 23, engaging post 18 and having a hole 28 engaging a vertical pin 27' on frame 10, in combination with a vertically-movable type-centering pin located above the periphery of the type-wheel, a feed mechanism mounted on the rack-bar, and connections between the disk and centering-pin and between the disk and feed mechanism, whereby the vertical movement of the disk centers the type and actuates the feed mechanism, substantially as shown and described.

6. In a type-writer, a rack-bar 3, a frame 7, supporting a horizontal type-wheel and connected by sliding sleeves 9 with the rack-bar 3, a rotary sleeve 45, mounted on the rack-bar 3 between sleeves 9 and having a rear projection 46, and arms 44 on its front, with ink-pads 43 located between the periphery of the type-wheel and supports 44' on frame 7, in combination with a feed mechanism consisting of an impression-lever 29, hinged to frame 7, a lever 33, hinged to frame 7 and having a slot 32 engaging a pin 31 on lever 29, the pin 31 having a depending arm 47 engaging projection 46, a spring-actuated arm 35, pivoted to lever 33 and having a lateral arm 36 engaging the teeth 37 of rack-bar 3, and a forked lug 41 on lever 29, having the type-centering pin 15 and the type-hammer 41', substantially as shown and described.

7. In a type-writer, a rack-bar 3, a frame 7, connected by sliding sleeves 9 with the rack-bar 3 and having a vertical post 18, a horizontal type-wheel mounted on the post 18 and having a vertical pin 27', a vertically-movable disk 20, mounted on post 18, with a hole 28 engaging pin 27', and an impression-lever 29, pivoted to frame 7, connected with the feed mechanism and having a forked lug 41 engaging the edge of disk 20, in combination with a type-centering pin 15 and type-hammer 41', located above the periphery of the type-wheel, substantially as shown and described.

8. In a type-writer, the combination, with a rotary type-wheel constructed with the elastic type-carrying arms 11, of an impression-lever 29, having the type-centering pin 15, the spring-actuated type-hammers 41' and 48, located in perforations 52 in lever 29, and levers 49, pivoted in ears 50 on the hammers 41' and 48 and having projecting ends 51, substantially as shown and described.

9. In a type-writer, the combination, with a rotary type-wheel constructed with the elastic type-carrying arms 11, of a lever 29, having the type-centering pin 15, and the spring-actuated type-hammers 41' and 48, located in perforations 52 in lever 29, with levers 49 pivoted in ears 50 on the hammers 48 and having projecting ends 51, substantially as shown and described.

10. The combination, with the base having a longitudinally-extending feed-bar, of a reciprocating carriage mounted at its rear end thereon to swing vertically, a rotary horizontal type-disk mounted on the carriage and provided with a circular series of type, a vertically-movable rotary disk 20 for rotating the type-disk, mounted concentrically with said type-disk, a lever pivoted to the rear part of the carriage above the feed-bar and connected with the rear edge of disk 20, a type-hammer operated by said lever, and a feed mechanism on the rear part of the carriage, engaging the said feed-bar and operated by said lever, substantially as set forth.

PHILIP P. WENZ.

Witnesses:
HENRY M. MILLER,
WM. H. FORKER.